(12) United States Patent
Kim

(10) Patent No.: US 6,562,091 B2
(45) Date of Patent: May 13, 2003

(54) SLURRY FOR CHEMICAL MECHANICAL POLISHING OF A SEMICONDUCTOR DEVICE AND PREPARATION METHOD THEREOF

(75) Inventor: Wan-Shick Kim, Cheongju (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 42 days.

(21) Appl. No.: 09/961,383

(22) Filed: Sep. 25, 2001

(65) Prior Publication Data

US 2002/0035807 A1 Mar. 28, 2002

Related U.S. Application Data

(62) Division of application No. 09/379,000, filed on Aug. 23, 1999, now abandoned.

(30) Foreign Application Priority Data

Oct. 26, 1998 (KR) ............................................. 98-44869

(51) Int. Cl.$^7$ ............................. C09C 1/68; C09K 3/14
(52) U.S. Cl. ............................. 51/309; 51/307; 51/308; 106/3
(58) Field of Search .......................... 51/307, 308, 309; 106/3

(56) References Cited

U.S. PATENT DOCUMENTS

| | | | |
|---|---|---|---|
| 3,170,273 A | 2/1965 | Walsh et al. | 51/308 |
| 3,715,842 A | 2/1973 | Tredinnick et al. | 51/308 |
| 3,874,129 A | 4/1975 | Deckert et al. | 51/308 |
| 4,011,099 A | 3/1977 | Gutsche | 51/308 |
| 4,117,105 A | 9/1978 | Hertzenberg et al. | 252/313 R |
| 4,462,188 A | 7/1984 | Payne | 51/308 |
| 4,816,072 A * | 3/1989 | Harley et al. | 106/287.18 |
| 4,956,015 A | 9/1990 | Okajima et al. | 51/308 |
| 5,128,281 A | 7/1992 | Dyer et al. | 437/225 |
| 5,395,801 A | 3/1995 | Doan et al. | 437/225 |
| 5,693,239 A | 12/1997 | Wang et al. | 51/309 |
| 5,780,358 A | 7/1998 | Zhou et al. | 438/645 |

* cited by examiner

*Primary Examiner*—Michael Marcheschi
(74) *Attorney, Agent, or Firm*—Fleshner & Kim, LLP

(57) ABSTRACT

A method for preparing a slurry for a chemical mechanical polishing process for a semiconductor device includes putting an organic matter in a solvent, preparing a solution by adding a dispersant to the solvent having the organic matter, hydrolyzing the solution, stirring the solution, and heating the solution. A slurry embodying the present invention has relatively small hydrate particles having a hardness lower than oxide particles, and the particles will remain dispersed in a solution for a longer period of time than background art slurries.

12 Claims, 3 Drawing Sheets

SLURRY FOR CHEMICAL MECHANICAL POLISHING OF A SEMICONDUCTOR DEVICE AND PREPARATION METHOD THEREOF

This application is a Divisional of application Ser. No. 09/379,000 filed Aug. 23, 1999 now abandoned.

BACKGROUND OF THE INVENTION

1. Field of the Invention

The present invention relates to a slurry for conducting a chemical mechanical polishing (CMP) process on a semiconductor material, and a preparation method thereof

2. Background of the Related Art

Generally, products of Cabot Corp. and Rodel Corp. are widely used as a conventional slurry for performing a CMP process for a semiconductor device. Those slurries are fabricated by preparing oxide fumed silica, which is an oxide, and dispersing the oxide in a solvent by hydrating the surface of the oxide with a dispersant.

A flame oxidation process, which is one of the conventional slurry preparation methods, will be described with reference to FIGS. 1A and 1B. As shown in FIG. 1A, the flame oxidation is performed by introducing a silicon halide gas into a furnace 1 in an oxygen-hydrogen atmosphere. Silica ($SiO_2$) particles are produced, according to the following formula, at a temperature over about 1200° C. The $SiO_2$ particles are deposited on a bottom of the furnace 1, and the other reaction product, HCl gas, is externally exhausted. The reaction formula is
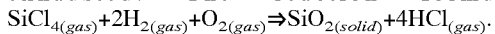

The silica particles that result from the reaction are taken out of the furnace 1 and put into a solvent 2, such as distilled water or alcohol, as shown in FIG. 1B. Then, the slurry for the CMP process is formed by stirring the solvent 2 with a dispersant 3, such as $NH_4OH$ or KOH, and an additive 4 to increase viscosity.

The dispersant 3 dissociates in the solvent 2 and induces an electric charge on surfaces of the silica particles. The electric charges on the surfaces of the particles cause the particles to repel each other, and the silica particles are thus stably dispersed in the solvent.

The size of the slurry particles which are prepared by the flame oxidation process irregularly range from 30 nm to a few hundred nm, and many large particles are produced. The large particles easily precipitate out of the slurry, due to the force of gravity. For this reason, it is impossible to use the slurry for a long time. Also, the slurry should be continually stirred while in use to reduce precipitation of the larger particles.

In addition, when large particles are formed, the surface area of the particles for a given volume of the slurry is relatively small. As a result, the electric charge volume of the particles decreases, and the repulsion force between particles is reduced. This also shortens the life of the slurry.

Further, because the silica particles prepared by the flame oxidation method are crashed when being stirred, the shapes of the particles become angulated. The edges of such silica particles, which have high hardness, may scratch a surface of a wafer during a CMP process.

Morever, because the slurry can be prepared by dispersing the particles in the solvent 2 after formation of silica particles, the preparation process of the slurry becomes complicated.

SUMMARY OF THE INVENTION

The present invention is directed to a slurry for use in a CMP process, and to a preparation method thereof, which obviates the problems and disadvantages of the conventional art.

An object of the present invention is to provide a slurry that has a relatively long life.

Another object of the invention is to provide a preparation method for a slurry that results in a slurry having a large number of small particles, so that the particles are less likely to precipitate out of the solution.

Another object of the present invention is to provide a slurry which includes hydrate particles, which have a lower hardness than the oxide particles of a conventional slurry, to thereby prevent scratching of a semiconductor wafer surface.

A slurry embodying the present invention includes a solvent, and hydrate particles dispersed within the solvent. The hydrate particles may comprise of aluminum hydrate or silicon hydrate. Preferably, the particles are substantially spherical and have a diameter of less than approximately 50 nm.

A method embodying the present invention include the steps of putting an organic matter into a solvent; adding a dispersant to the solvent to form a solution; hydrolyzing the solution; stirring the solution; and heating the solution. The organic matter added to the solvent may comprise aluminum or silicon. The dispersant added to the solvent may comprise nitric acid. The heating step may comprise heating the solution in a reaction vessel that includes a condenser, so that substantially all the solution that evaporates during the heating process is condensed and returned to the solution.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

A detailed description of preferred embodiments will be provided in conjunction with the following drawing figures, wherein like elements are referred to with like reference numbers, and wherein.

DETAILED DESCRIPTION OF PREFERRED EMBODIMENTS

In a method embodying the present invention, a slurry for a CMP process is prepared by homogeneously nucleating solid particles, which are hydrated by hydrolysis in a solution, and thereby dispersing spherical hydrate particles therein. The method for preparing a slurry according to an embodiment of the present invention will be described with reference to FIGS. 2A and 2B.

Figure 1A:
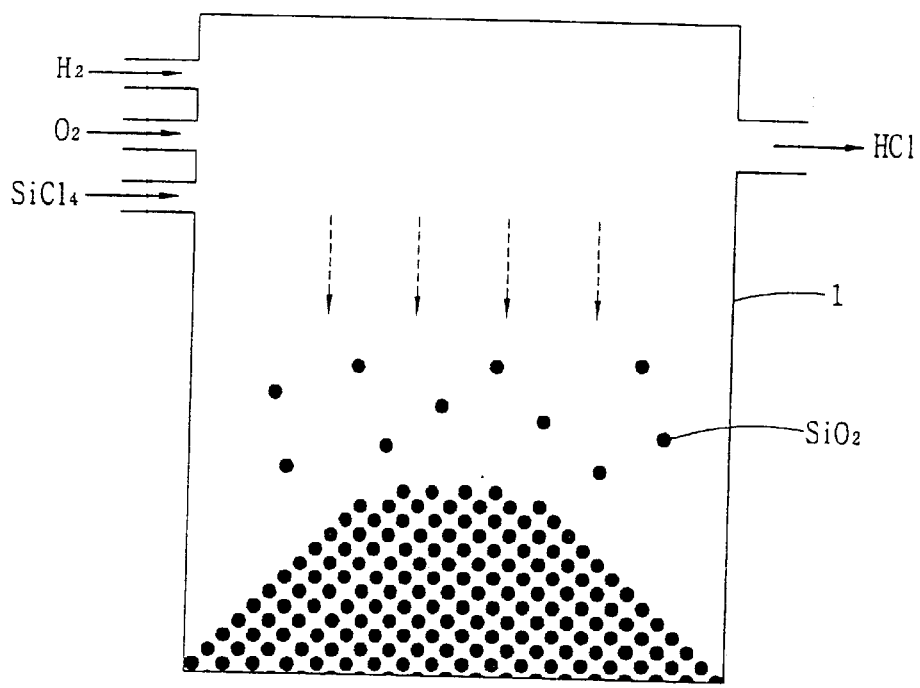
FIGS. 1A and 1B are diagrams sequentially illustrating a background art flame oxidation method for preparing a slurry for a CMP process for a semiconductor device.
Figure 1B:
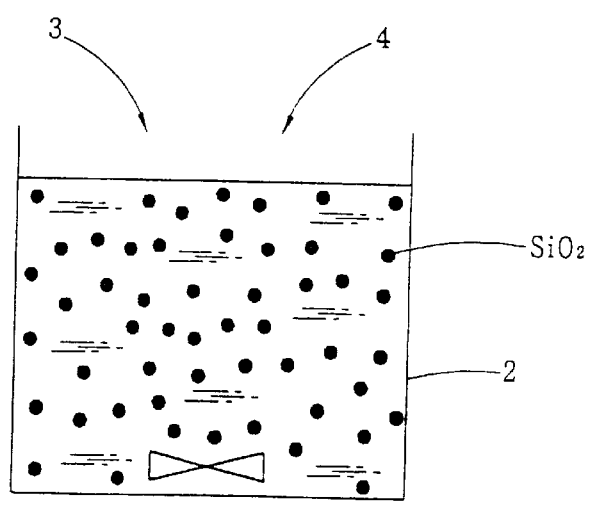
Figure 2A:
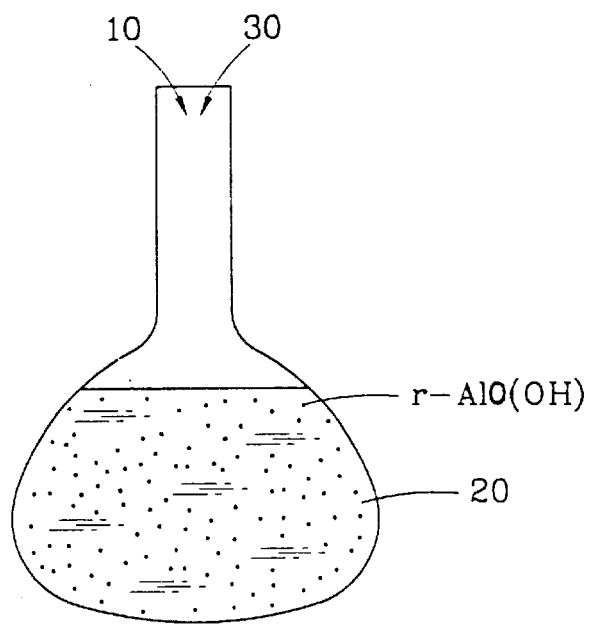
FIGS. 2A and 2B are diagrams sequentially illustrating a method for preparing a slurry for a CMP process for a semiconductor device according to the present invention.

An organic matter 10, such as aluminum tri sec butoxide (ATSB) or aluminum iso propoxide (AIP: $Al(OC_3H_7)_3$), is first prepared. As shown in FIG. 2A, the organic matter 10 and a dispersant 30, such as $HNO_3$, is mixed in a solvent 20. The solvent 20 may be distilled water at approximately 25°

C. The mixing results in the formation of boehmite (γ-AlO(OH)), which are aluminum hydrate particles. $HNO_3$ and ATSB are desirably mixed when the ratio of the hydrogen ions dissociated from $HNO_3$ of the dispersant 30 to aluminum ions dissociated from the organic matter 10, that is $H^+/Al^{3+}$, is between approximately 0.07–1.0.

Figure 2B:
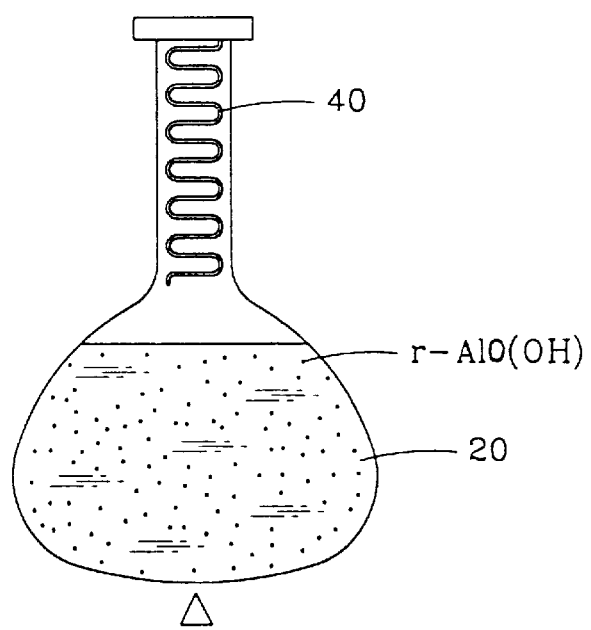

Next, as shown in FIG. 2B, after rapidly sting the solution with the hydrate particles for approximately 8–12 min, the solution is heated to about 90° C., which is the boiling point, in a reaction vessel having a condenser 40. Any portion of the solution which is evaporated as a result of heating is condensed by a refrigerant passing through the condenser 40. The heating preferably continues for approximately 2 hrs. This process results in the formation of an aluminum hydrate slurry in which boehmite (γ-AlO(OH)), aluminum hydrate particles, are stably dispersed.

Relatively small particles can be produced, in general, in a low-temperature hydrolysis process according to the homogeneous nucleation theory. However, when hydrolyzing the organic matter at temperatures under approximately 80° C., aluminum hydrate is initially produced by the hydrolysis. The aluminum hydrate changes to bayerite (β-Al(OH)$_3$) within 2–3 hrs. Therefore, to maintain the boehmite (γ-AlO(OH)), which is easily dispersed in the solution, the solution with the hydrate particles should be heated over approximately 87° C. After maintaining the heating state for approximately 2 hr, the boehmite stably exists in the solution.

Figure 3:
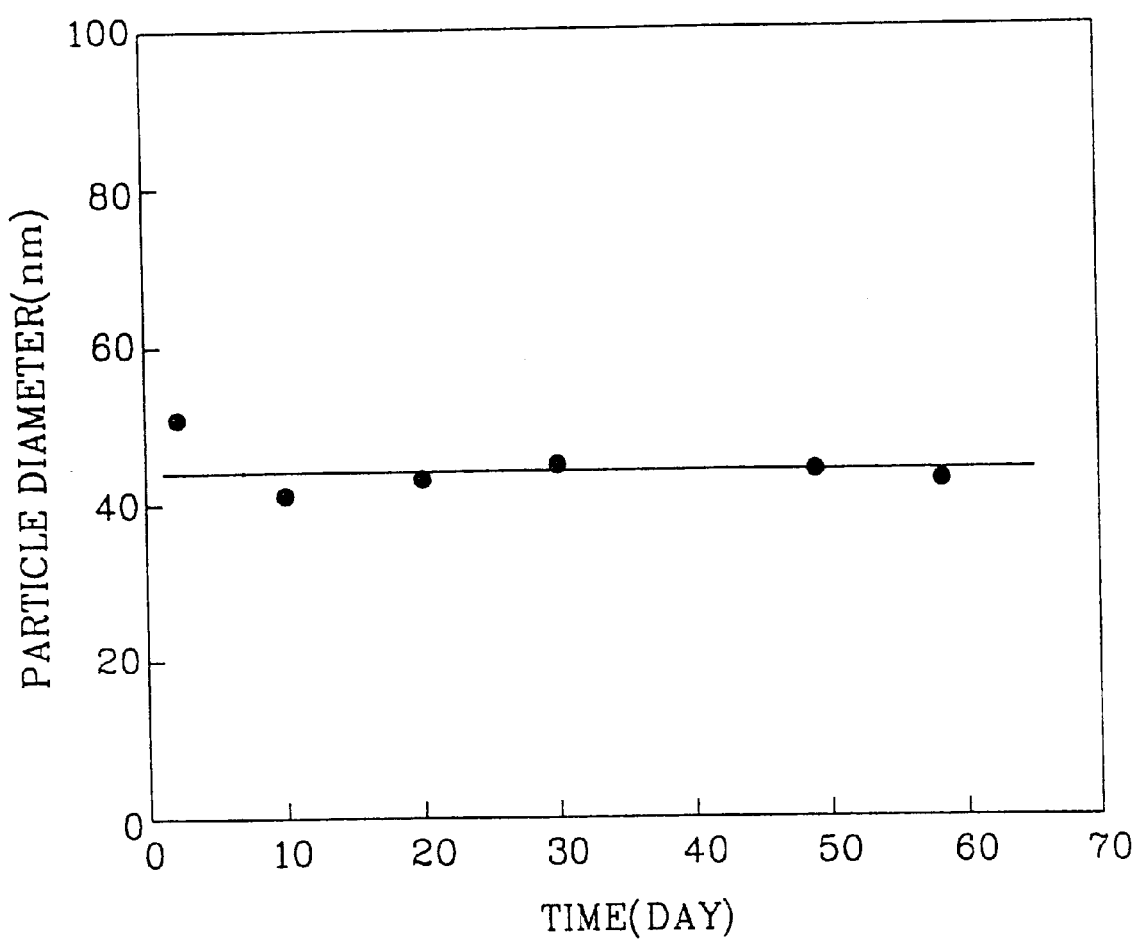
FIG. 3 is a graph illustrating how the sizes of particles change, as a function of time, in a slurry for a CMP process that was prepared according to the present invention.

FIG. 3 illustrates how the size of the particles in a slurry prepared according to the present invention will change over time. As shown therein, the aluminum hydrate slurry is very stable, and the size of the particles remains at approximately 40 nm, even after being exposed to the atmosphere for 60 days.

The size of the aluminum hydrate particles can be adjusted by changing the hydrolysis temperature and/or the ion ratio. The particles become smaller when lower temperatures are used or when the ion ratio of $H^+/Al^{3+}$ is increased. It is even possible to reduce the size of the particles.

In another embodiment of the present invention, a silicon hydrate slurry can be prepared. Here, an organic matter such as tetra ethyl ortho silicate (TEOS) is used as the organic matter, and thus silicon hydrate ($SiO_xH_y$) particles are produced.

A slurry according to the present invention has several advantages. First, since the size of the particles is small, the particles are not easily precipitated by gravity, and thus it is possible to use the slurry for a relatively long time. Also, because of the small particle size, the particles have a large surface area per unit volume, and an electric charge volume induced on the surfaces of the particles is relatively large. The repulsion forces among the particles is correspondingly large, due to the large induced electric charge, which results in prevention of cohesion of the particles. Accordingly, in a slurry according to the present invention, the particles are stably dispersed and no stirring is required.

In addition, since the particles produced by the homogeneous nucleation in the solution have a small spherical shape, and because the hardness thereof is lower than that of oxide particles of conventional art slurries, the particles of a slurry embodying the present invention do not tend to scratch a wafer during a CMP process. Further, because a chemical reaction between OH-radicals attached to the surfaces of the hydrate particles of the slurry and the wafer surface occur during the CMP process, using a slurry embodying the present invention results in a faster polishing speed, and the same results can be produced with less slurry.

Furthermore, because the particles of a slurry embodying the invention are directly formed in a solution, a process according to the present invention is more simple than the conventional methods, in which the particles must first be formed, then the particles are dispersed in the solvent.

It will be apparent to those skilled in the art that various modifications and variations can be made to a slurry, and the preparation method thereof, embodying the present invention without departing from the spirit or scope of the invention. Thus, it is intended that the present invention cover the modifications and variations of this invention provided they come within the scope of the appended claims and their equivalents.

The foregoing embodiments are merely exemplary and/or illustrative, and the description given herein is not intended to limit the scope of the claims. Many alternatives, modifications, and variations will be apparent to those skilled in the art.

What is claimed is:

1. A method for preparing a CMP slurry, comprising the steps of:
    putting an organic matter in a solvent;
    adding a dispersant to the solvent having the organic matter therein to form a solution;
    hydrolyzing the solution;
    stirring the solution; and
    heating the solution.

2. The method according to claim 1, wherein the step of putting an organic matter in the solvent comprises putting an aluminum organic matter in the solvent.

3. The method according to claim 2, wherein the aluminum organic matter is aluminum tri sec butoxide (ATSB).

4. The method according to claim 2, wherein the aluminum organic matter is aluminum iso propoxide ($Al(OC_3H_7)_3$).

5. The method according to claim 1, wherein the step of putting an organic matter in the solvent comprises putting a silicon organic matter in the solvent.

6. The method according to claim 5, wherein the silicon organic matter is tetra ethyl ortho silicate (TEOS).

7. The method according to claim 1, wherein the step of adding a dispersant comprises adding nitric acid ($HNO_3$).

8. The method according to claim 1, wherein the step of putting organic matter in a solvent and the step of adding dispersant to the solvent result in an ion ratio of $H^+/Al^{3+}$ of between approximately 0.07–1.0.

9. The method according to claim 1, wherein the stirring is performed for approximately 8–12 min.

10. The method according to claim 1, wherein the step of heating the solution is performed using a reaction vessel having a condenser, and wherein substantially all of the solution evaporated by the heating step is condensed by a refrigerant of the condenser.

11. The method according to claim 1, wherein the heating is performed for approximately two hours or more.

12. The method according to claim 1, wherein the solution is heated to a temperature above a boiling point of the solution.

* * * * *